United States Patent [19]

Schembri

[11] E Patent Number: Re. 33,474

[45] Reissued Date of Patent: Dec. 4, 1990

[54] OPTICAL FIBER BANDWIDTH LIMITING METHOD

[75] Inventor: John J. Schembri, Danville, Calif.

[73] Assignee: Pacific Bell, San Francisco, Calif.

[21] Appl. No.: 326,231

[22] Filed: Mar. 20, 1989

Related U.S. Patent Documents

Reissue of:

[64] Patent No.: 4,696,063
Issued: Sep. 22, 1987
Appl. No.: 771,266
Filed: Aug. 30, 1985

[51] Int. Cl.[5] ..... H04B 10/12

[52] U.S. Cl. ..... 455/612; 350/96.16

[58] Field of Search ..... 455/602, 610, 606–607, 455/612, 619; 350/96.16

[56] References Cited

U.S. PATENT DOCUMENTS 4,406,003 9/1983 Eberly ..... 455/612
4,479,701 10/1984 Newton et al. ..... 455/612
4,555,810 11/1985 Khoe et al. ..... 455/612

FOREIGN PATENT DOCUMENTS 60-51336 3/1985 Japan ..... 455/612

OTHER PUBLICATIONS

Jones et al., "Optical Fiber T-Carrier", Conference NTC 78 Conf. Record of the IEEE 1978 Nat. Telecomm. Conf. Birmingham, Ala., Dec. 3–6, 1978, pp. 5.1.1–5.1.6.

"ADC Fused Couplers", Flier, ADC Magnetic Controls Co., Minneapolis, Minn., 2 pages.

Newton et al., Conference on Optical Fiber Communications, Tech. Digest, Jan. 1984, New Orleans, La.

*Primary Examiner*—Joseph A. Orsino
*Assistant Examiner*—L. Van Beek
*Attorney, Agent, or Firm*—McCubbrey, Bartels, Meyer & Ward

[57] ABSTRACT

A fiber optic telephone system is described in which a plurality of subscribers with different bandwidth subscriptions are each connected to the system by an optical fiber subscriber connection. Use of the subscriber connection beyond the subscription bandwidth is prevented by the installation of a bandwidth limiting device having a maximum transmitted bandwidth capacity above that of the subscription bandwidth but below that of the total bandwidth capacity of the subscriber connection.

2 Claims, 1 Drawing Sheet

OPTICAL FIBER BANDWIDTH LIMITING METHOD

Figure 1:
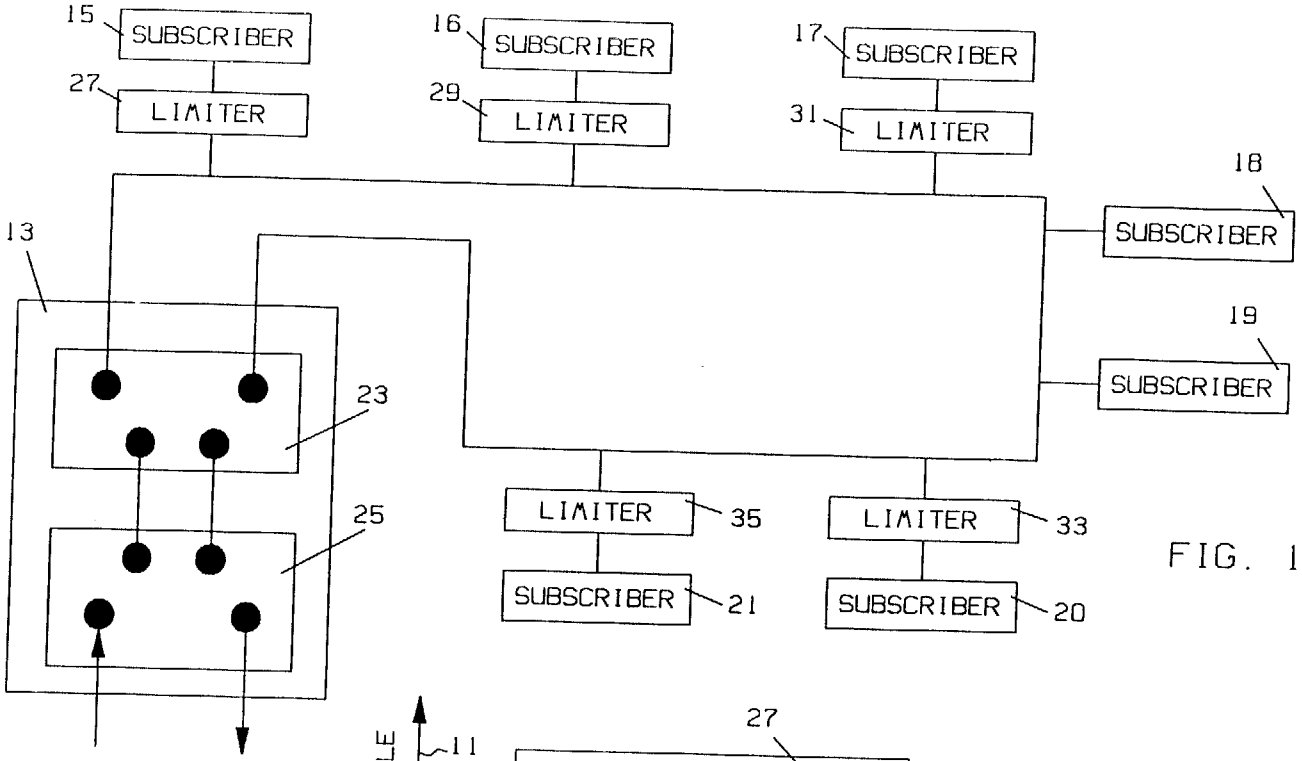

Matter enclosed in heavy brackets [ ] appears in the original patent but forms no part of this reissue specification; matter printed in italics indicates the additions made by reissue.

This invention relates to fiber optic communication systems. More particularly, the invention relates to the administration of and configuration of a fiber optic communication system in which use, by subscribers, of a subscriber connection is limited to the particular service which the subscriber contracts for.

Communication systems employing optical fibers for transmission of voice, data, or video signals are already in use and are eventually expected to replace many conventional copper wire communication systems. One example of a fiber optic communication system is shown and described in U.S. patent application Ser. No. 644,206. In this system, as is the case with other fiber optic telephone systems, a plurailty of subscribers are connected into the system by an optical fiber subscriber connection. Such a connection may, for example, be direct from a subscriber to the central office, or may be patched into a fiber optic loop, such as is shown and described in the aforementioned patent application.

Optical fiber, because of its very high information carrying capacity, may provide the possibility of a much higher level of service than a particular customer needs or desires in a given subscriber connection. Since typical telephone company business practice is to charge a subscriber only for the level of service the subscriber actually wants, the subscriber connection in many instances may have a capability far in excess of that which the subscriber contracts for. Where the optical fiber subscriber connection is capable of higher level use than is contracted for by a particular subscriber, the potential exists that a dishonest subscriber could use his connection at a higher level than he has paid for.

Although in most cases it is possible to use an active device to monitor the information actually being transmitted by the subscriber over a particular subscriber connection, for example the bit rate of digital information, such a procedure may be costly and cumbersome. Without such monitoring, however, the possibility for abuse on the part of the subscriber, by utilizing the subscriber connection beyond that which the subscriber subscription agreement calls for, becomes very real.

It is an object of the present invention to provide an improved method and means for the administration of a fiber optic communication system.

Another object of the invention is to provide a fiber optic communication system wherein the extent of use of a particular subscriber connection by a subscriber may be controlled.

Another object of the invention is to provide a fiber optic communication system in which the extent to which a subscriber utilizes a particular subscriber connection may be easily changed.

Another object of the invention is to provide a fiber optic communication system using low-cost, passive devices to limit subscriber bandwidth.

Figure 2:
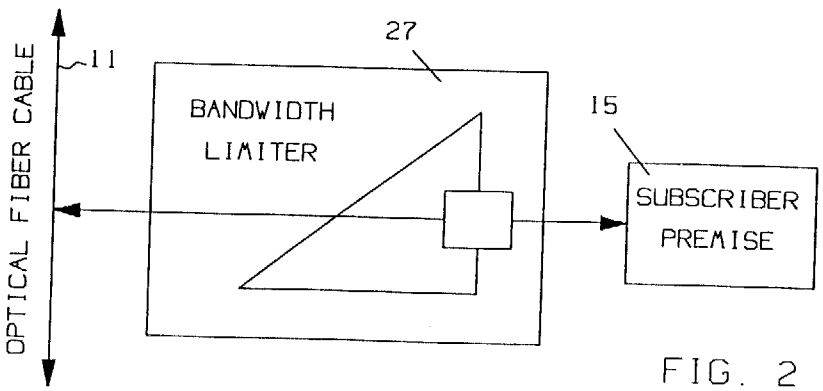

Other objects of the invention will become apparent to those skilled in the art from the following description, taken in connection with the accompanying drawings wherein:

FIG. 1 is a schematic drawing of a fiber optic communication system having a plurality of optical fiber subscriber connections, which system is modified in accordance with the invention; and FIG. 2 is a schematic diagram of a single optical fiber subscriber connection modified in accordance with the invention.

Very generally, in a fiber optic communication system having a plurality of subscribers with different bandwidth subscriptions, each connected to the system by an optical fiber subscriber connection, the invention is employed to prevent use of the subscriber connection beyond the subscription bandwidth. This is done by installing, for subscribers with a bandwidth subscription less than the total capacity of the subscriber connection, a bandwidth limiting device having a maximum transmitted bandwidth above that of the subscription bandwidth but below that of the total capacity of the subscriber connection.

Referring now to FIG. 1, a fiber optic communications system is illustrated schematically. The system illustrated in FIG. 1 is intended to represent, generally, the class of telephone systems in which an optical fiber cable 11 extends from a central office 13. A plurality of subscribers 15–21 are connected to the cable 11, which is a continuous bundle of individual optical fibers. In FIG. 1, the cable 11 is in the form of a loop. In such a case, each subscriber connection may be a pair of optical fibers extending from the subscriber premises, each fiber patching into one leg of a single corresponding fiber in the cable 11. More than one pair of fibers may extend to a subscriber premise either for increasing the subscriber capacity or for providing redundancy. Fibers may be reserved for transmit or receive functions, in which case a pair of fibers is needed for each subscriber. Alternatively, only a single fiber may be used and the information may be multiplexed.

In the particular system illustrated, redundancy is provided by the cable 11 being in the form of a loop. Since each subscriber premise is connected to the cable by a pair of fibers, one fiber connecting to one side of the loop and the other connecting to the other side of the loop, a failure of one side of the loop will not eliminate connection to the subscriber, since the other leg of the loop is still intact. A loop of the foregoing described design is shown and described in U.S. patent application Ser. No. 644,206, assigned to the assignee of the present invention.

It should be noted that although use of the invention in connection with such a loop is preferred, the invention is applicable to systems wherein the cable 11 does not form a loop with the central office 13. In such an instance, each fiber connection to a subscriber passes directly to the central office.

In any event, the subscribers 15–21 are connected to the central office 13 by optical fibers providing reception and transmission capabilities. The central office 13 may be of any suitable design and, for example, may contains switching devices 23 which provide for interconnecting various subscribers served by the looped cable 11 and for interconnecting such subscribers to other subscribers served by different central offices, as indicated by the output switching system 25.

Typically, all efforts in optical fiber telephone systems are directed to maximizing the distance over which transmission is possible. This distance is limited by both attenuation and dispersion. However, since typical manufacturing techniques result in very low levels of attenuation, the limitation imposed on transmission is typically dispersive in nature.

Dispersion limits bandwidth by causing the different frequency components of a signal to travel at different velocities. The result is distortion of an analog signal or a spreading out (in both space and time) of pulses in digital signals. Assuming no or negligible attenuation, there would be a loss of signal amplitude as well as a pulse broadening, since the total energy in a pulse remains constant. When the pulses broaden sufficiently, the pulses overlap, producing errors and therefore setting a limit on the distance and the maximum pulse rate at which transmission can occur. (Although in principle it is possible to calculate the impulse response and the frequency response of optical fiber from the refractive index profile, in practice the calculation is very difficult and time consuming. Accordingly, the bandwidth of a fiber is typically determined by a pulse (time domain) measurement and converted to frequency response by a standard Fourier transform.)

Two types of dispersion are modal, arising from the different paths of light in various modes, and material, arising from the different velocities of different wavelengths. In a single-mode fiber, which exhibits no modal dispersion, material dispersion is the sole frequency-limiting mechanism. In any case, traditional engineering practice has [to] been to design optical fiber systems to minimize both modal and material dispersion.

The present invention departs from the spirit of such design practices. Instead, in accordance with the invention, dispersion is intentionally introduced into the system in the subscriber connection. This dispersion is introduced in a preselected way such as to provide the subscriber with the level of service which the subscriber has contracted for, but to prevent the subscriber from exceeding this level of service.

As may be seen in FIG. 1, for each of the subscribers 15, 16, 17, 20 and 21, a bandwidth limiting device 27, 29, 31, 33 and 35, respectively, is interposed between the subscriber premise and the optical fiber bus 11. Each bandwidth limiting device is selected to have a maximum transmitted bandwidth capacity above that of the particular bandwidth for which the subscriber has contracted but below that of the total capacity of the subscriber connection. Thus, for example, in the cases of the subscribers 18 and 19, no bandwidth limiting devices are installed and therefore the subscribers may use the subscriber connection to the fiber optic bus 11 to its maximum information capacity. In the case of the subscribers 18 and 19, this means that such subscribers would pay the highest rate for their subscriber connections. On the other hand, the remaining subscribers pay a lower rate based upon the limitation imposed by the particular bandwidth limiting device connected into their subscriber loop.

The particular form of bandwidth limiting device which may be installed in a subscriber connection may be of any suitable design. The device limits the bandwidth such as to transmit only those signals below a maximum transmitted bandwidth capacity. This maximum transmitted bandwidth is above that of the subscription bandwidth so as to provide the customer with the proper service, but is below that of the total capacity of the subscriber connection, thereby preventing the customer from utilizing the connection beyond that for which he pays.

One form of bandwidth limiting device 27 is shown in FIG. 2, illustrated in schematic form. The bandwidth limiter 27 contains a fiber optic coupler 37 connected to an optical fiber loop 39 which is connected into the subscriber loop between the cable 11 and the subscriber premise 15. The location of the device may be anywhere in the path between central office and subscriber if the fiber path is dedicated. The signal entering the coupler 37 produces a circulating light signal in the loop 39 which is an output pulse having a diminishing amplitude caused by material dispersion in the subscriber loop. The circulation of the signal causes dispersion of the pulse which introduces a bandwidth limitation which is dependent upon the degree of the material dispersion introduced.

Other devices for accomplishing bandwidth limiting are well known in the art. A signal delay device which will function in this manner is described by Newton, et al., Conference on Optical Fiber Communication, Jan. 23–25, 1984, New Orleans, La., Technical Digest. Reference is also made to Newton, et al., U.S. Pat. No. 4,479,701.

It may be seen, therefore, that the invention provides an optical fiber communication system in which abuse, on the part of the subscribers, of subscriber connections is prevented in a low cost economical manner. In the event a particular subscriber wishes to increase the level of his service, the bandwidth limiting device in his subscriber loop may be easily replaced by a device having a higher bandwidth capacity.

Various modifications of the invention in addition to those shown and described herein will become apparent to those skilled in the art from the foregoing description. Such modifications are intended to fall within the scope of the appended claims.

What is claimed is:

1. In a fiber optic communication system wherein a plurality of subscribers are connected to a central office by optical fiber connections over each of which information is transmitted pursuant to a subscription agreement designating a predetermined subscription bandwidth for each said optical fiber connection, each of said optical fiber connections providing an information path extending from said central office to a respective subscriber premise, the improvement comprising means for regulating subscriber usage of each of said optical fiber connections comprising a plurality of bandwidth limiting devices, each connected in series in a respective one of said optical fiber connections in said information path, each said bandwidth limiting device including means for introducing [material] dispersion to the associated one of said optical fiber connections beyond that inherently present in said connection, said material dispersion being selected to limit the bandwidth of the associated one of said optical fiber connections to the said subscription bandwidth designated in the said subscription agreement associated with said optical fiber connection by limiting the frequency which can be transmitted on the associated optical fiber connection to a maximum frequency which is greater than or equal to the subscription bandwidth for said subscriber optical fiber connection but below that of the total capacity of said subscriber optical fiber connection.

2. In the administration of a fiber optical communication system wherein a plurality of subscribers are connected to a central office by optical fiber connections over each of which information is transmitted pursuant to a subscription agreement designating a predetermined subscription bandwidth for each said optical fiber connection, each of said optical fiber connections providing an information path extending from the central office to a respective subscriber premise, a method of preventing use of subscriber connection beyond the subscription bandwidth, comprising, installing means for regulating subscriber usage of each of said connections, said regulating means comprising a plurality of bandwidth limiting devices, each connected in series in a respective one of said optical fiber connections in said information path, each said bandwidth limiting device including means for introducing [material] dispersion to the associated optical fiber connection beyond that inherently present, said material dispersion being selected to limit the bandwidth of the associated optical fiber connection to the said subscription bandwidth designated in the said subscription agreement associated with said optical fiber connection by limiting the frequency which can be transmitted on the said associated optical fiber connection to a maximum frequency which is greater than or equal to the subscription bandwidth for that subscriber optical fiber connection but below that of the total capacity of that subscriber optical fiber connection.

* * * * *

UNITED STATES PATENT AND TRADEMARK OFFICE

CERTIFICATE OF CORRECTION

PATENT NO. : Re. 33,474

DATED : December 4, 1990

INVENTOR(S) : John J. Schembri

It is certified that error appears in the above-identified patent and that said Letters Patent is hereby corrected as shown below:

Column 4, Line 51, delete "material" and insert therefor --[material]--.

Column 5, Line 12, delete "material" and insert therefor --[material]--.

Signed and Sealed this

Seventeenth Day of November, 1992

*Attest:*

DOUGLAS B. COMER

*Attesting Officer*

*Acting Commissioner of Patents and Trademarks*